(12) United States Patent
Ebert et al.

(10) Patent No.: US 7,445,424 B1
(45) Date of Patent: Nov. 4, 2008

(54) PASSIVE THERMOSTATIC BYPASS FLOW CONTROL FOR A BRUSH SEAL APPLICATION

(75) Inventors: Todd A. Ebert, West Palm Beach, FL (US); Alex Pinera, Jupiter, FL (US); Antonio Negron, Boqueron, PR (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 135 days.

(21) Appl. No.: 11/409,925

(22) Filed: Apr. 22, 2006

(51) Int. Cl.
*F01D 11/04* (2006.01)
(52) U.S. Cl. .................. 415/113; 415/115; 415/145
(58) Field of Classification Search .............. 415/115, 415/111, 112, 113, 144, 145
See application file for complete search history.

(56) References Cited

U.S. PATENT DOCUMENTS

| | | | |
|---|---|---|---|
| 3,635,586 A * | 1/1972 | Kent et al. | 416/97 R |
| 4,807,433 A | 2/1989 | Maclin et al. | |
| 5,022,817 A | 6/1991 | O'Halloran | |
| 5,064,343 A | 11/1991 | Mills | |
| 5,181,728 A | 1/1993 | Stec | |
| 5,522,698 A | 6/1996 | Butler et al. | |
| 5,575,616 A | 11/1996 | Hagle et al. | |
| 5,800,125 A * | 9/1998 | Largillier et al. | 416/96 R |
| 6,551,056 B2 | 4/2003 | Rau | |
| 6,558,114 B1 | 5/2003 | Tapley et al. | |
| 6,644,668 B1 | 11/2003 | Albers et al. | |
| 6,761,034 B2 | 7/2004 | Niday et al. | |

* cited by examiner

*Primary Examiner*—Edward Look
*Assistant Examiner*—Dwayne J White
(74) *Attorney, Agent, or Firm*—John Ryznic

(57) ABSTRACT

In a gas turbine engine having a rim cavity formed between a rotor disk and a stator, and a brush seal or other seal member providing an airflow seal between the stator and a side plate of the rotor disk, a thermally responsive valve device is located in the bypass passage of the stator to form a parallel air flow path with the brush seal. As the brush seal wears and the leakage airflow around the worn brush seal increases, the air flow temperature in the rim cavity would decrease. The thermally responsive valve device would detect the decreasing airflow temperature, and reduce the airflow passing through the bypass passage in order to prevent the temperature of the rim cavity from decreasing. The temperature responsive valve device makes use of a bimetallic valve member that regulates airflow based upon temperature.

20 Claims, 8 Drawing Sheets

PASSIVE THERMOSTATIC BYPASS FLOW CONTROL FOR A BRUSH SEAL APPLICATION

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates to gas turbine engines, and more particularly to a passive cooling system for a rim or rotor cavity.

2. Description of the Related Art including information disclosed under 37 CFR 1.97 and 1.98

As gas turbine engine evolution reaches a mature state, factors which plays an important role in deciding which engine to choose for a particular application may ultimately come down to durability and performance in the form of specific fuel consumption (SFC) or cycle efficiency and heat rate. Engine component material selection and their material properties play a major role in performance. Engine components must be cooled to acceptable levels and there are usually many trade studies performed to optimized concepts to best maintain component temperature while using the minimum amount of cooling flow. The cooling flow is supplied by compressor extraction or bleed and while work was required to compress this air, since it is used for parasitic flow purposes, it is not passed through the turbine for work to extraction. For this reason, secondary flows are usually called chargeable flows. Most conventional turbine rotor systems encompass bladed disks as opposed to blisks which are integrally bladed disks. For these conventional disks, their maximum operating temperatures are usually well below that of flow path material such as rotating blades and stationary vanes. A secondary flow designer computes the minimum rim cavity purge flows based on a particular rim seal design and as well as flow path pressure asymmetries which are a mechanism for ingestion. It is desirable to provide the minimum flow required to resolve cavity windage rise, and prevents hot gas ingestion. For robust designs, the design point for sizing cooling systems is usually at some level of engine deterioration where components, especially seals wear and the cycle is less efficient which ultimately leads to higher turbine flow path temperatures. The secondary flow designer can predict system performance at the deteriorated condition, where the life of gas path components such as blades and vanes required replacement, or in "as shipped" configuration, when the engine is shipped out of the manufacturing facility. The ideal system would be to have constant secondary flows throughout component life cycle.

A Prior Art rotor or rim cavity purge arrangement is disclosed in U.S. Pat. No. 5,181,728 issued to Stec on Jan. 26, 1993 and entitled TRENCHED BRUSH SEAL (the entire disclosure of which is incorporated herein by reference) in which a rotor cavity 82 is purged with seal leakage air flow that passes through a brush seal 70 to prevent the ingress of hot gases into the cavity which otherwise would cause a detrimental increase in the temperature and consequent reduction in life of the rotor 60. One problem with the Prior Art is that, when the brush seal wears, more seal leakage airflow passes into the cavity than when the engine was in the "as shipped" factory condition. Thus, more airflow is heated than needed, and therefore the overall engine efficiency decreases.

The concept for a constant flowing rim cavity encompasses the use of a brush seal, but can be used in conjunction with any seal that has considerable wear over time from its shipped state to the end of a components life. While brush seals have many advantageous applications in a gas turbine, one area of challenging application is in rotor rim cavities, especially stage 1 rim cavity since gas path conditions are most severe as well as flow path pressure asymmetry due to wakes from vane trailing edges. The excellent sealing characteristic that makes the brush seal a good candidate for many applications is the same characteristic that makes the application in rim seals a challenge. Since brush seals usually flow much less than the minimum required cavity flow to prevent hot gas ingestion and resolve cavity windage, when in the line to line or radially contacting position, a seal bypass hole can be provided to supply the additional amount of desired flow. U.S. Pat. No. 5,522,698 issued to Butler et al. on Jun. 4, 1996 entitled BRUSH SEAL SUPPORT AND VANE ASSEMBLY WINDAGE COVER (the entire disclosure of which is incorporated herein by reference) shows a bypass hole in parallel with the brush seal to provide purge airflow for the rim cavity. This flow is usually supplied with some injection angle in the direction of rotation to reduce rim cavity windage. The difficulty with this system is when the engine is shipped, the brush seal is not worn and the desired flows are mainly provided by the bypass holes. The problem becomes clear after brush seals wear. As the seals wear due to the cycling of the engine which lead to seal rubs, the brush seal flow consumption increases, but the bypass hole still exists and by the end of component life cycle, the system will flow as much or more that with a convection labyrinth seal. The economic advantage of the above mentioned system over conventional labyrinth seals is that the wear is exponential in nature where the labyrinth seal rub is instant. The area under the curve of flow versus time will translate to fuel savings over time. This savings is usually not enough to justify the cost of using the brush seal. A system that provides for constant flow would have the most economic advantage. FIG. 1 depicts a Prior Art device in which a brush seal 34 leakage air flow is in parallel with a bypass flow thorough passages 30.

BRIEF SUMMARY OF THE INVENTION

The invention provides for several ways to have a passive thermostatically controlled bypass opening such that as the brush seal wears and passes more flow, the bypass holes close down to keep the same level of flow in a deteriorated system as in factory shipped condition.

The first configuration is to use a spring loaded valve with or without a ratcheting device to be sized for a given thermal gradient. As the brush seals wears, leakage flow through the brush seal will increase, thereby reducing the cavity temperature. The thermostatic spring is sized to contract due to the lower temperature gradient as a result of this increased flow over time. Installing such a device would cause an oscillation in displacement as a result of its thermal cyclic environment. A ratcheting device can be provided to alleviate constant thermal cycling of the bypass mechanism as well as rotor cavity components. This concept is depicted in FIG. 2.

The second configuration employs a bimetallic strip which would be sized to have an axial displacement at some desired temperature differential from the cold side to the hot cavity side. This concept is shown in FIG. 3. Other shapes such as a cylindrical bimetallic valve can be used as well. As the cavity temperature drops, due to brush seal wear, the bi metallic strip would straighten to close the bypass gap. This device can be fitted with a ratcheting devise as well to avoid thermal cycling.

DETAILED DESCRIPTION OF THE INVENTION

Figure 2:
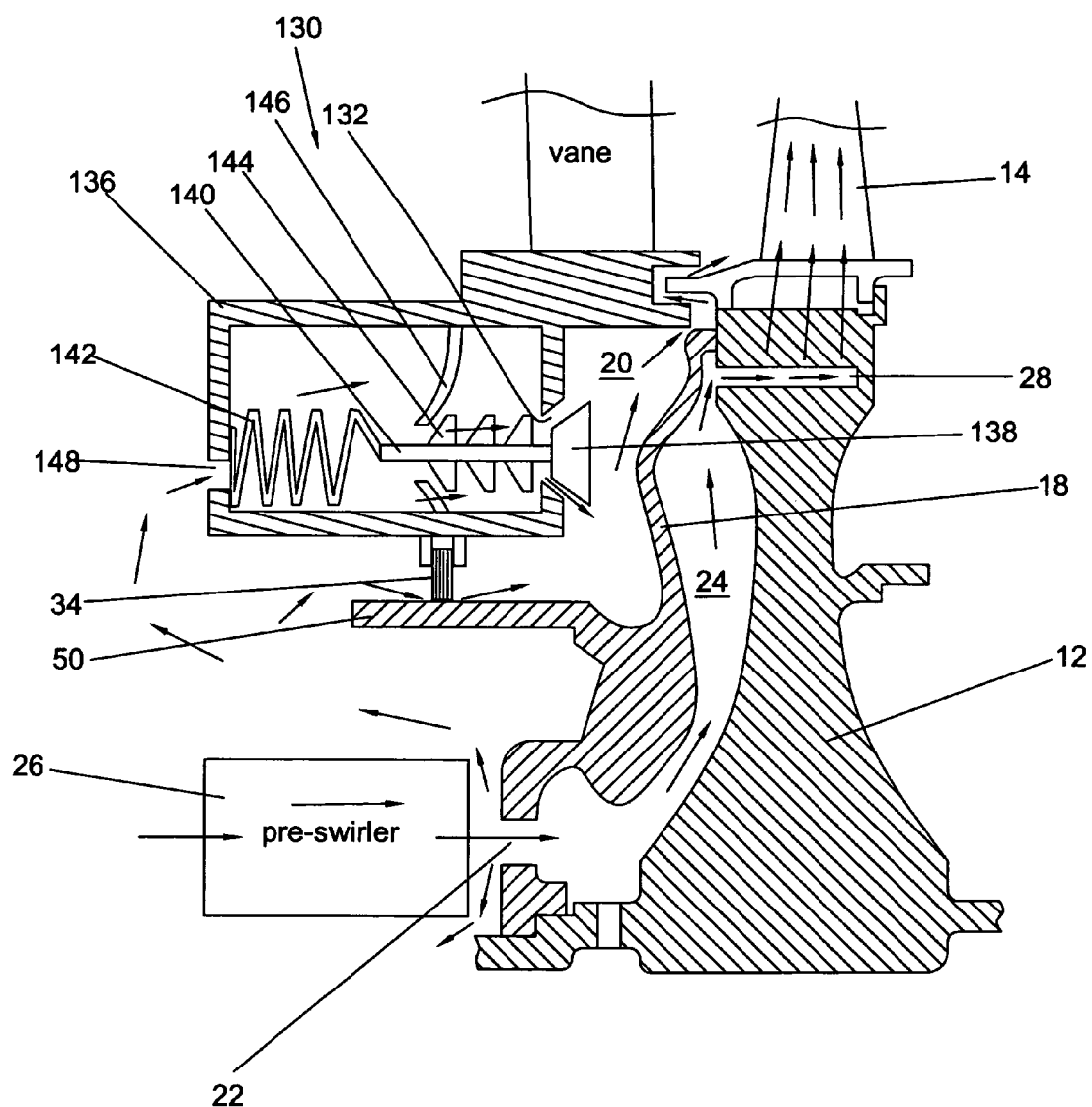
FIG. 2 shows a cross section view of a gas turbine engine with a brush seal and a passive spring loaded valve with a ratcheting device to control bypass flow to the rim cavity.

A first stage turbine nozzle and blade assembly is shown in FIG. 2, in which a rotor disk 12 carries a plurality of blades, and a stationary nozzle 16 guides a hot gas stream onto the rotating blades 14 to drive the turbine shaft. A side plate 18 extends over the axially forward surface of the rotating rotor disk 12 assembly. A rim cavity 20 is defined by an axial separation between the stationary turbine nozzle assembly and the rotating rotor assembly 12. The side plate 18 also includes an aperture 22 in the web of the side plate to permit cooling fluid to flow through and into a disk cavity 24 formed between the side plate 18 and the rotor disk 12. A pre-swirler 26 delivers airflow from a compressor (not shown) and swirls the airflow before discharging the airflow into the side plate aperture 22. The airflow then flows into the disk cavity 24 and into a passage 28 in the rotor disk 12 that leads into a plurality of passages in the blade 14 for cooling.

The stationary nozzle assembly 13 includes a bypass passage 130 and a brush seal assembly 34 as in the prior art. But, the present invention includes a passively controlled thermally responsive valve in the bypass passage 132 to regulate airflow into the rim cavity 20. The stationary nozzle assembly 13 includes a chamber box assembly 136 that contains a bypass valve head 138, a valve stem 140, and a biasing spring 142. A ratcheting device includes a plurality of ratcheting teeth 144 that engage with ratcheting fingers 146 that extend from an inner surface of the chamber box 136. An airflow opening 148 is located on the upstream end of the chamber box 136 to allow for airflow from the pre-swirler 26 to enter the chamber box 136. The brush seal assembly 34 includes a brush seal that extends from the stationery nozzle assembly and forms a seal with the rotating surface 50 of the side plate 18. Air from the compressor flows through the pre-swirler 26 and into the opening 148 in the chamber box 136, and then into the rim cavity 20 to purge the rim cavity 20 and prevent an inflow of hot gas from the gas stream and to resolve undue heating in the rim cavity 20. Some of the airflow from the pre-swirler 26 also flows past the brush seal 34 as leakage and into the rim cavity 20 to also aid in purging the rim cavity 20.

The valve assembly within the camber box 136 is made of a material such that the airflow temperature in the rim cavity 20 will cause the bypass valve head 138 to move toward a closed position. The bypass valve head 138 is exposed to the airflow temperature in the rim cavity 20. As the airflow temperature in the rim cavity 20 drops (due to wear of the brush seal resulting in a higher leakage flow into the rim cavity 20) the bypass valve head 138 temperature will approach the temperature of the airflow in the box rim cavity 20. The valve stem 140 and spring 142 will also be cooled by heat transfer to the bypass valve head 138, resulting in the metal spring assembly to contract and close the bypass valve passage 132. As the brush seal 34 wears, more airflow leaks past the brush seal 34 and into the rim cavity 20. More cooling airflow into the rim cavity 20 results in the temperature of the airflow in the rim cavity 20 to drop. This drop in temperature is used as an indication of wear from the brush seal 34. As the airflow temperature in the rim cavity decreases, the valve assembly passively detects this and acts to close the valve head 138 to reduce the airflow through the bypass passage 32. As the airflow through the bypass passage 32 is reduced, the airflow temperature in the rim cavity 20 will increase to the normal operating design temperature, even with increased airflow leakage through the brush seal 34 due to wear.

One of the features of the present invention is a ratcheting device to limit the oscillation of the bypass valve head 138 as a result of a thermally cyclic environment. The ratcheting device includes a plurality of ratcheting teeth 144 extending from the valve stem 140 that engage ratcheting fingers 146. The teeth 146 and fingers 146 are oversized in the figure to show the concept only. As the rim cavity temperature decreases due to wear of the brush seal 134, the bypass valve head 138 will move toward the closed position, and the fingers 146 will engage the teeth to prevent the valve head 138 from returning to the original position. The number and size of the ratcheting teeth will be such that the valve head 138 will provide enough bypass air flow into the rim cavity 20 when the brush seal has zero wear (and, therefore minimum leakage) to purge the rim cavity in the most opened position to the most closed position in which the bypass airflow is minimum and the leakage airflow past the brush seal 34 is the maximum due to the most wear (before needing to be replaced).

The bypass valve assembly can be made from any material that will produce the results required to close the valve when the airflow temperature in the rim cavity 20 drops due to the wear of the brush seal 34.

Figure 3:
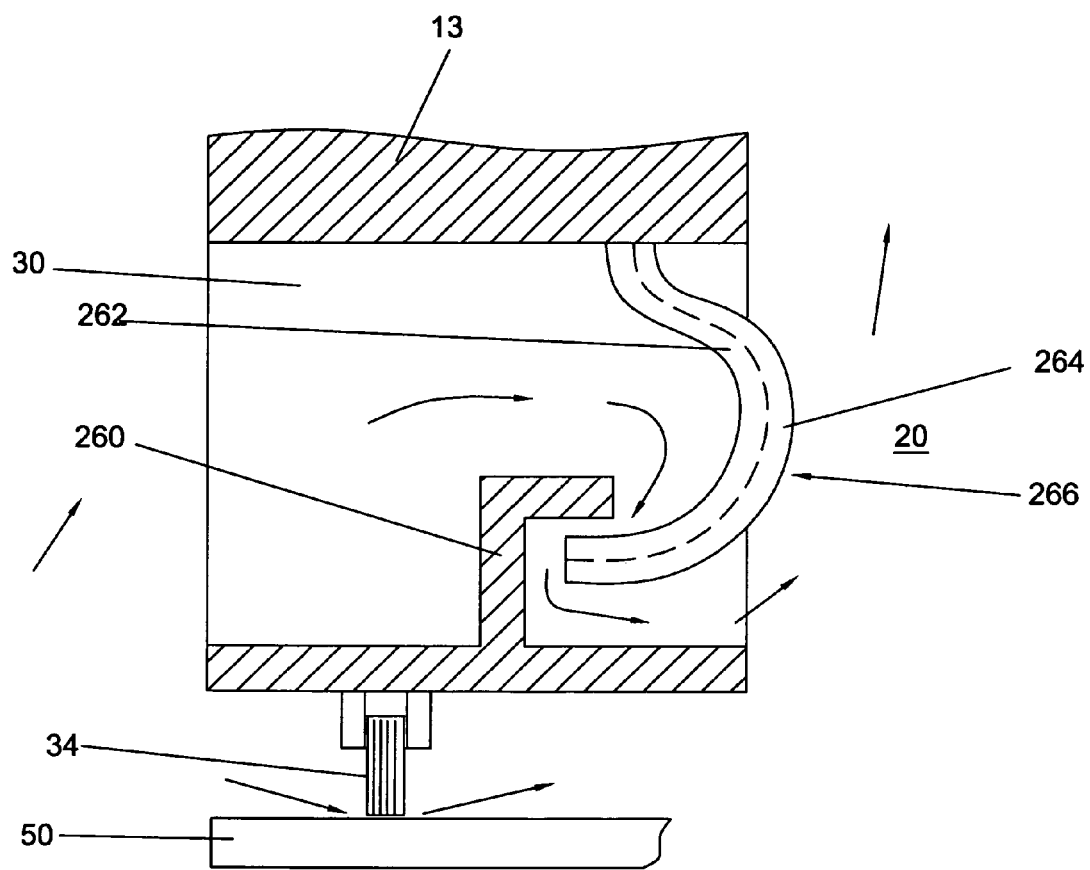
FIG. 3 shows a second embodiment of the present invention in which the passive thermostatic bypass flow control device is a bimetallic member.

A second embodiment of the present invention is shown in FIG. 3. The passive thermostatic bypass flow control device in the FIG. 3 embodiment is a bimetallic member 266 made of an inside metallic sheet 262 bonded to an outside metallic sheet 264 in which one of the two sheets has a different thermal expansion coefficient than the other in order to cause the bimetallic member 266 to block the airflow in the bypass passage 30 against an air flow restriction forming member 260. The bimetallic member 266 and flow restriction forming member 260 are formed within the bypass passage 30 of the stator 13. The brush seal 34 extends from the bottom of the stator 13 as in the prior art device. The size of the bypass passage 30 and bimetallic flow restricting assembly (266 and 260) are shown much larger than normal for illustration purposes. The outside metal sheet 264 is located near the exit of the bypass passage 30 so that the sheet is exposed to the airflow in the rim cavity. The material properties of the two metallic sheets are such that, with a temperature decrease of the airflow in the rim cavity due to brush seal 34 wear, the bimetallic member 266 will bend such that the tip approaches the upper ledge of the air flow passage forming member 260 and reduce the air flow through the bypass passage 30 and into the rim cavity 20.

Figure 4:
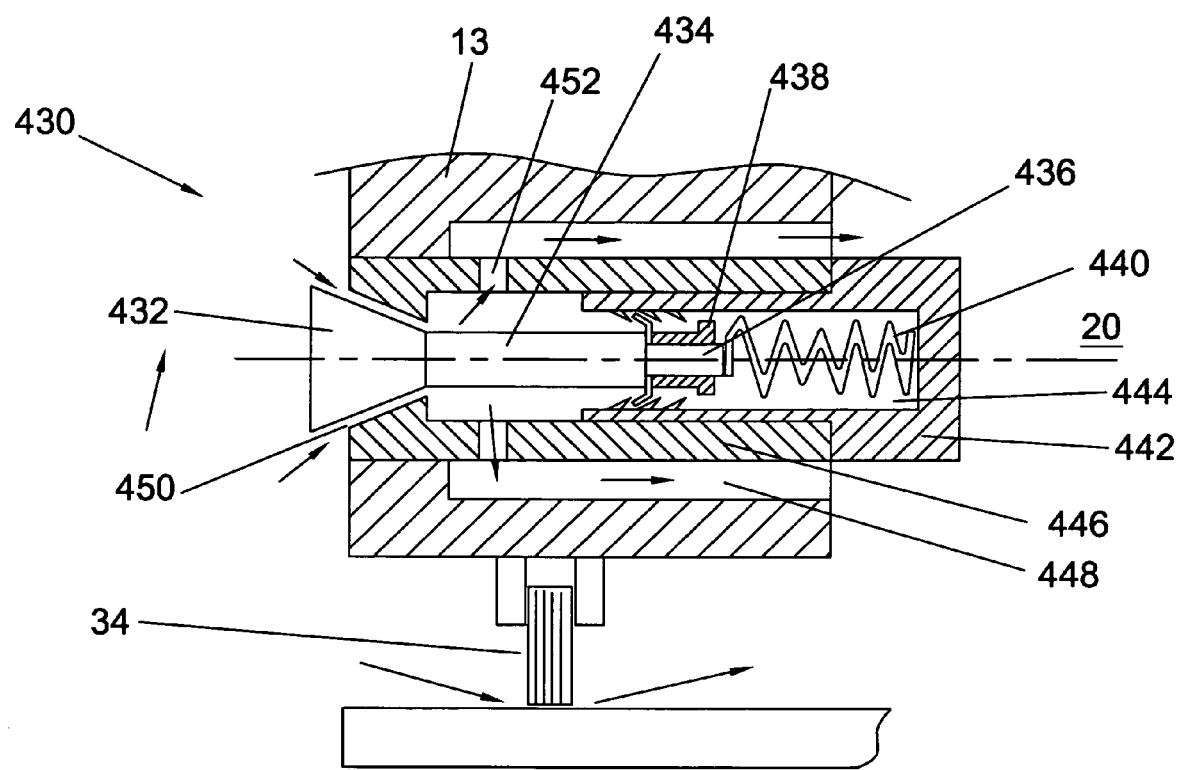
FIG. 4 shows a third embodiment of the present invention in which the passive thermostatic bypass flow control device is a spring loaded valve assembly with the air flows around the outside of the valve assembly.

A third embodiment of the present invention is shown in FIG. 4. The passive thermostatic bypass flow control device in the FIG. 4 embodiment is a valve assembly 430 that is inserted into a hole of the stator assembly 13 extending from the vane. The valve assembly 430 includes a valve head 432, a valve stem 434 extending from the valve head 432, and a valve stem tip 436 extending from the valve stem 434 at an opposite end from the valve head 432. The valve head and stem is supported for axial movement within a valve outer cylinder member 446. An angled surface 450 is formed on the valve outer cylinder member 446 and forms a flow restriction with the valve head 432. A valve inner cylinder member 442 is secured to an open end of the valve cylinder member 446 to close that end. A thermally responsive biasing spring member 440 is positioned within a spring chamber 444 of the valve outer cylinder 446 between the valve stem tip 436 and the surface of the valve inner cylinder member 442. Radial holes 452 are formed around the valve outer cylinder member 446, and the valve assembly 430 fits within a stepped hole formed in the stator assembly 13 such that an outer axial passages 448 is formed around the outer surface of the valve outer cylinder member 446. The brush seal assembly 34 extends from the stator assembly 13 as in the previous embodiments. A ratcheting member is secured between a flat surface of the valve stem 434 and a tip nut 438 threaded to the valve stem tip member 436. The ratcheting member extends radially outward from the valve stem 434 to engage a plurality of latching teeth that extend radially inward from the valve cylinder closure member 442. The ratcheting device functions to limit the oscillation of the bypass valve head 432 as a result of a thermally cyclic environment as in the FIG. 2 embodiment.

The operation of the FIG. 4 embodiment is now described. The open bypass passage holes 30 that already appear in the stator 13 of the prior art have the valve assembly 430 of the FIG. 4 present invention inserted therein, one valve assembly 430 per bypass passage hole 30 in the stator 13. The valve head 432 is in the most open position when the brush seal 34 is new (or, without wear), the valve head 432 being positioned to allow for the proper amount of air to flow through the valve assembly 430 and into the rim cavity 20 in order to purge the rim cavity 20 when the brush seal 34 allows for the minimum leakage flow. Bypass air flows between the valve head 432 and an angled surface 450 on the end of the valve outer cylinder member 446, through the radial holes 452, into the outer axial passage 448, and out of the valve assembly 430 and into the rim cavity 20. As the brush seal 34 wears, the leakage air flow increases into the rim cavity 20, decreasing the temperature of the air in the rim cavity. As the air temperature in the rim cavity 20 decreases, the heat transfer through the valve cylinder closure member 442 passes into the spring chamber 444 and the spring 440. As the spring 440 cools—due to the decrease air flow temperature in the rim cavity 20—the spring contracts to gradually move the valve head toward a closed position. The air flow through the valve restriction (formed between head 432 and surface 450) decreases as the spring 440 contracts to reduce the air flow through the valve assembly. Thus, as the leakage flow around the brush seal 34 increases, the valve head 432 closes to decrease the bypass flow through the valve assembly 430 in order to maintain a constant air temperature in the rim cavity 20.

Figure 1:
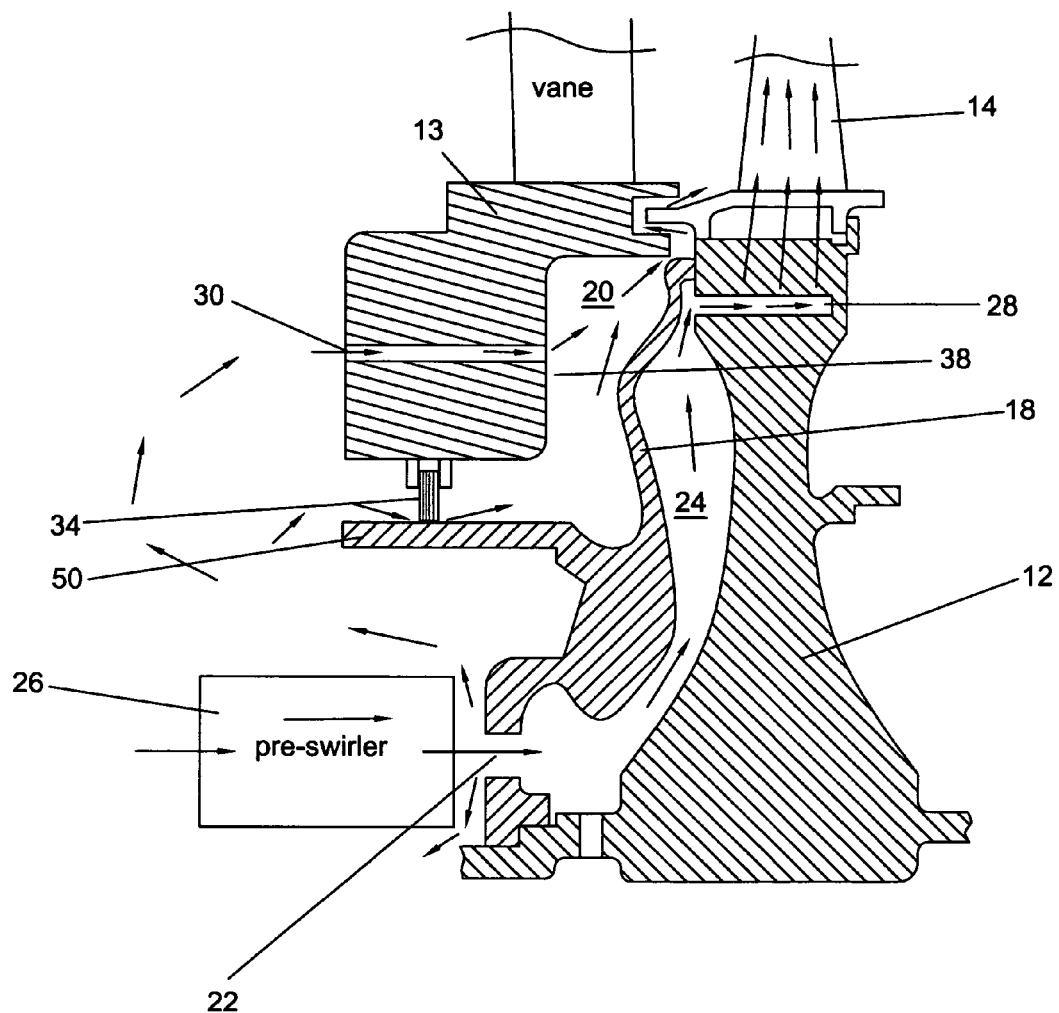
FIG. 1 shows a Prior Art gas turbine engine with a brush seal and a plurality of bypass passages to provide cooling air to the rim cavity.
Figure 5:
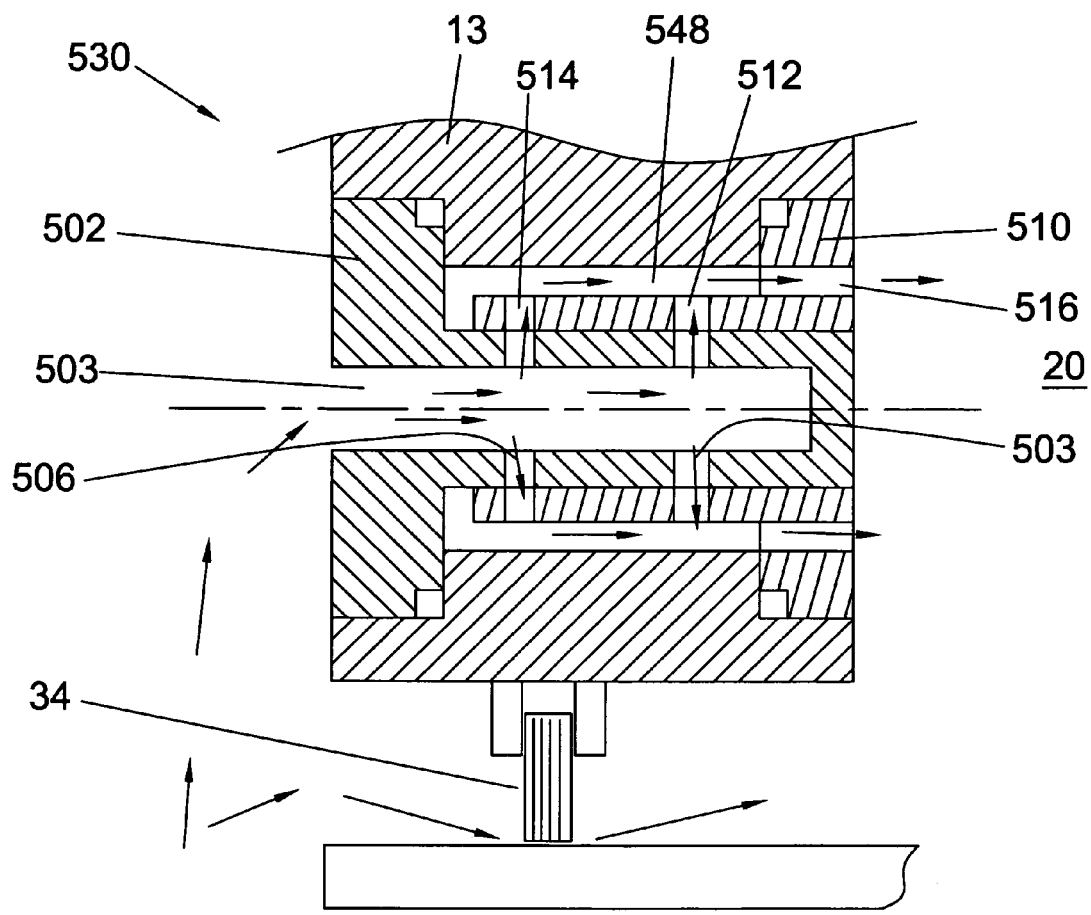
FIG. 5 shows a fourth embodiment of the present invention in which the passive thermostatic bypass flow control device is a valve assembly with concentric cylindrical members having radial holes to pass the air flow through the valve assembly around the outside of the valve assembly.

A fourth embodiment of the present invention is shown in FIG. 5, which is a valve assembly 530 that is intended to be inserted into the unobstructed passage 30 of the prior art FIG. 1 assembly. With the FIG. 5 embodiment, the airflow through the passage 30 can be regulated as the brush seal 34 wears and the bypass flow increases at the brush seal. The valve assembly 530 includes a main stem member 502 with a central axial passage 503 open on the upstream side and a plurality of radial holes 504 and 506 located in series along the central axial passage 503. A valve sleeve member 510 also includes as plurality of radial holes 512 and 514 located in series. Booth the main stem member 502 and the valve sleeve member 510 include annular projections that abut stepped portions that are formed in the passage 30 of the stator 13 in order to secure the valve assembly 530 in the passage 30. An outer axial passage 548 is formed between the inner surface of the passage 30 and the outer surface of the valve member 530. Axial holes 516 in the annular projection of the valve sleeve member 510 provide a fluid communication between the outer axial passage 548 and the rim cavity 20. The main operation of the valve member 530 is provided by forming the main stem member 502 and the valve sleeve 510 from materials having different thermal expansion coefficients such that the radial holes are displaced. When the brush seal 34 is new (no wear such that leakage is minimum), the radial holes 506 and 514 are in alignment and radial holes 504 and 512 are in alignment such that the maximum airflow occurs through the valve assembly 530. As the brush seal 34 wears, and the leakage airflow past the seal 34 increases, the rim cavity 20 temperature decreases, the valve assembly 530 senses this decrease in temperature and the radial holes move out of alignment such that airflow through the valve assembly 530 decreases.

Figure 6:
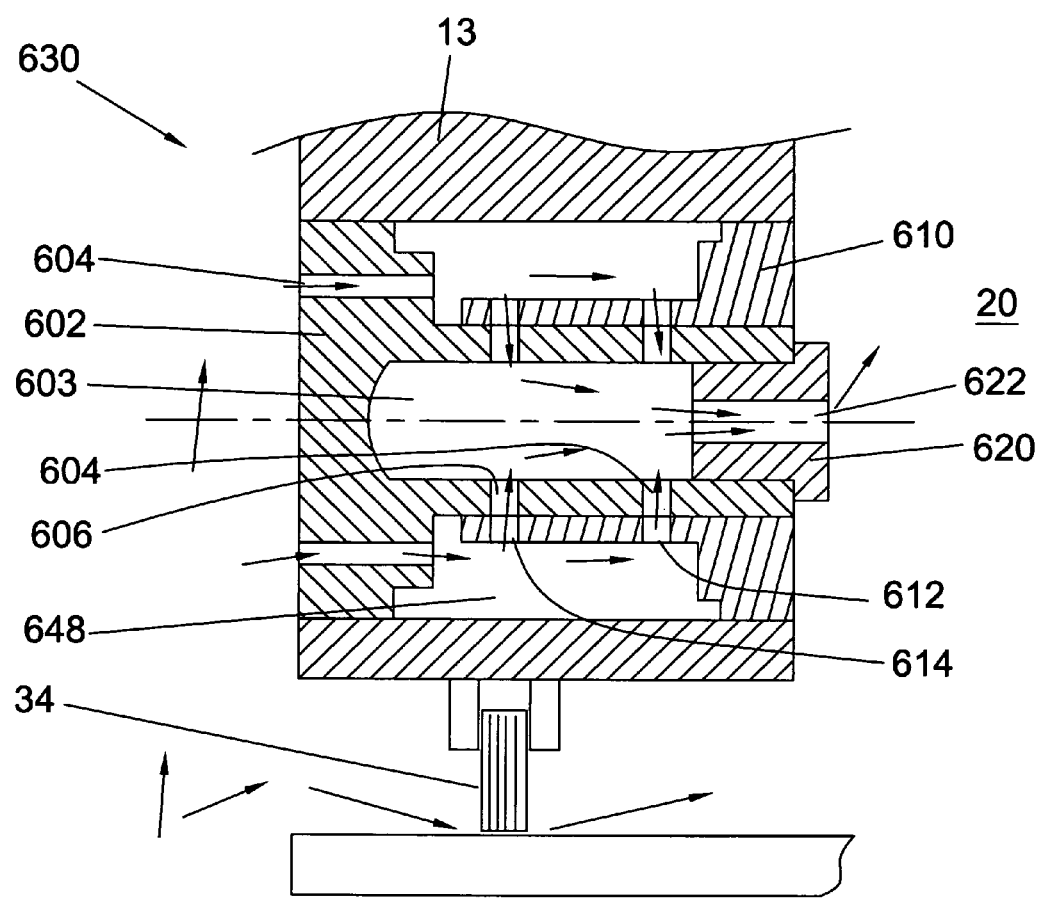
FIG. 6 shows a fifth embodiment of the present invention in which the passive thermostatic bypass flow control device is a valve assembly with concentric cylindrical members having radial holes to pass the air flow through the valve assembly through the inside of the valve assembly.

A fifth embodiment of the present invention is shown in FIG. 6, and is similar to the fourth embodiment of FIG. 5. The valve assembly 630 includes a main stem member 602 with axial holes 604 spaced around the axis of the main stem member 602, the main stem member 602 forming an central axial passage 603, a valve sleeve member 610, and radial holes 604 and 606 in the main stem member 602 and radial holes 612 and 614 in the valve sleeve member 610. An outer axial passage 648 is formed between the inner wall of the passage 30 in the stator 13 and the outer surface of the valve assembly 630. A plug member 620 with a central axial hole 622 closes the opening of the central axial passage 603 in the main stem member 602. Airflow passes through the axial holes 604 and into the outer axial passage 648, through the radial holes into the central axial passage 603, and through the central axial hole 622 of the plug member 620 and out into the rim cavity 20. As in the fourth embodiment of FIG. 5, the valve assembly is formed of two materials having different coefficients of thermal expansion so that the airflow through the valve assembly can be regulated by displacing the alignment of the radial holes as the temperature in the rim cavity 20 changes due to wear of the brush seal 34. When the brush seal 34 is new, the radial holes are in alignment for maximum airflow, and move out of alignment to progressively block the airflow as the holes move out of alignment.

Figure 7:
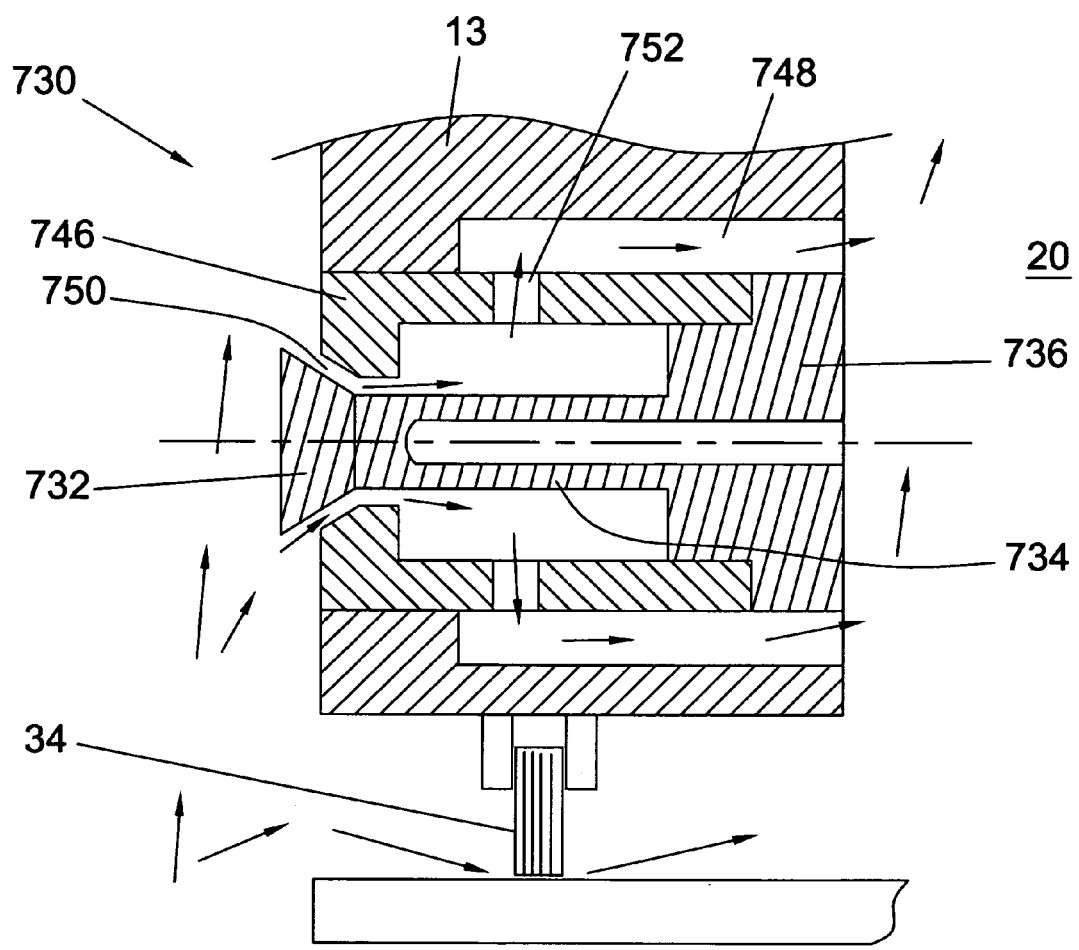
FIG. 7 shows a sixth embodiment of the present invention in which the passive thermostatic bypass flow control device is a valve assembly with a thermally responsive valve head that moves to block the air flow through the bypass valve assembly.

A sixth embodiment of the present invention is shown in FIG. 7, and is similar to the third embodiment of FIG. 4. The valve assembly 730 is inserted into the passage 30 of the stator 13 in which an annular outer axial passage 748 is formed. The valve assembly 730 includes an inner valve stem member 736 with a valve head 732 and valve stem 734, and an outer sleeve member 746 having radial holes 752 spaced around the sleeve and an angled surface that forms a restricted passageway 750 with the valve head 732. The inner valve stem member 736 and the outer sleeve member 746 are made of materials having different thermal expansion coefficients in order to produce relative movement and close reduce the restricted passageway 750. The restricted passageway 750 is at the maximum opened position when the brush seal is new, where the restricted passageway 750 progressively closes as the brush seal 34 wears. The temperature in the rim cavity 20 is exposed to the surface of the valve stem member 736. As the rim cavity 20 temperature drops, the valve stem 734 temperature also drops and shortens in length, resulting in the restricted passageway 750 to become more restricted.

Figure 8:
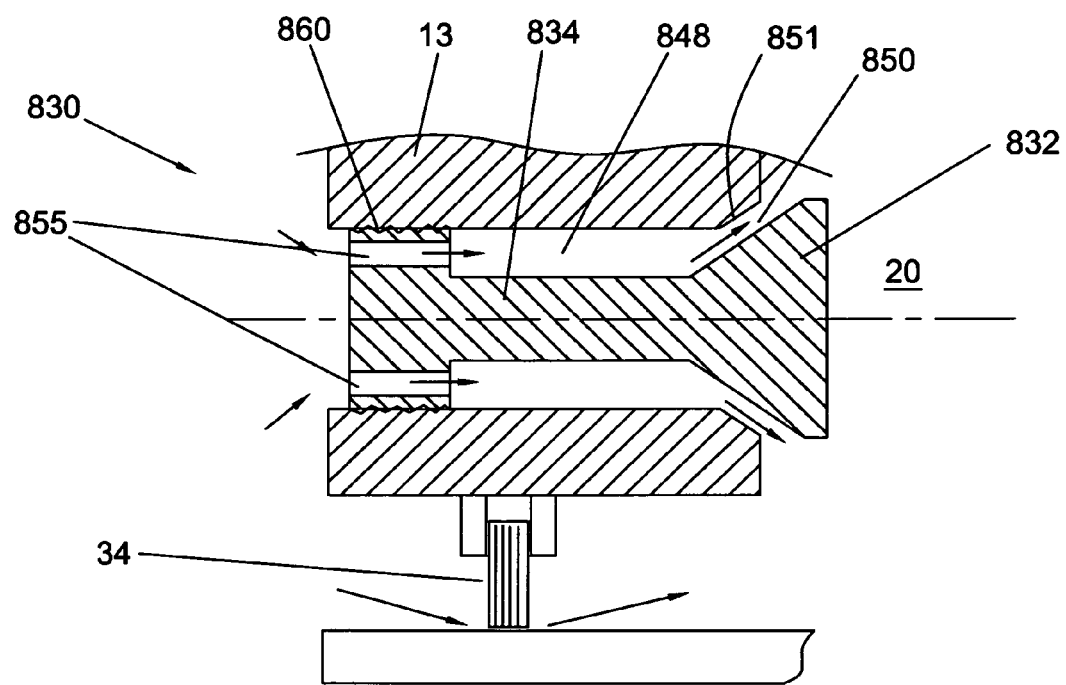
FIG. 8 shows a seventh embodiment of the present invention in which the passive thermostatic bypass flow control device is a valve having a single piece that is threaded into the bypass hole.

A seventh embodiment of the present invention is shown in FIG. 8. This is the simplest embodiment of the present invention in that the thermally responsive valve 830 formed from a single piece and is threaded into the hole by screw threads 860 formed on the valve and the inner surface of the hole. The valve 830 includes a ring member with a plurality of holes 855 therein to allow passage of the cooling air, a stem portion 834 that forms a cooling air passage 848 in the bypass passage, and a valve head 832 that forms a flow restriction 850 between the head 832 and a beveled portion 851 formed on the exit end of the bypass passage in the stator. To insert the valve 830 of the FIG. 8 embodiment, threads 860 must be formed in the bypass passage and a beveled portion 851 formed on the exit end of the bypass passage. The beveled portion 851 is optional, but is desired in order to form a good flow restriction surface. As the temperature in the rim cavity 20 increases, the heat will transfer to the head 832 of the valve 830 and into the stem 834 and cause the valve to grow in length, resulting in the flow restriction 850 to increase to allow more cooling air flow through the valve 830. As the brush seal 34 wears and the cooling air flows through the brush seal and into the rim cavity 20, the temperature drops and the valve 830 will shrink in length, decreasing the flow restriction and lowering the cooling air flow through the valve 830 and into the rim cavity 20.

The present invention improves the overall efficiency of the gas turbine engine by preventing excess bypass flow from entering the rim cavity by using a passive controlled bypass valve that is responsive to thermal temperature of the airflow in the rim cavity. The bypass valve is also positioned by a ratcheting device to limit oscillation of the valve head.

We claim the following:

1. In a gas turbine engine having a rotor and a stator adjacent to the rotor, a rim cavity with a brush seal forming a seal leading into the rim cavity, and a bypass air passage passing through the stator and into the rim cavity such that airflow through the brush seal and through the bypass passage forms a parallel air flow into the rim cavity, the improvement comprising:
a thermally responsive air flow device associated with the bypass air passage and responsive to the air temperature in the rim cavity, the thermally responsive air flow device decreasing the airflow through the bypass air passage as the brush seal wears.

2. The gas turbine engine of claim 1, and further comprising:
the thermally responsive air flow device comprising:
a chamber box member forming the bypass passage;
a valve head member forming a variable restriction and having a surface exposed to the rim cavity;
a valve stem member connected to the valve head member; and,
a thermally responsive spring member connected to the valve stem member;
the spring member and the valve stem member being confined within the box cavity.

3. The gas turbine engine of claim 2, and further comprising:
a ratcheting member to limit the oscillation of the bypass valve head as a result of a thermally cyclic environment.

4. The gas turbine engine of claim 1, and further comprising:
the thermally responsive air flow device comprising:
a bimetallic member extending from the stator and in the bypass passage, the bimetallic member having a first metallic sheet exposed to the airflow temperature in the rim cavity and a second metallic sheet secured to the first sheet on an opposite side; and,
an airflow passage forming member extending from the stator and in the bypass passage, and forming a flow restriction with the tip of the bimetallic member;
whereby a change in temperature exposed to the bimetallic member changes the flow restriction.

5. The gas turbine engine of claim 1, and further comprising:
the thermally responsive air flow device further comprises:
a valve assembly inserted within the bypass passage, the valve assembly
including an outer cylinder member, a valve head movable within the cylinder member and forming a flow restrictor with an inlet of the outer cylinder member, radial holes in the cylinder member to provide an airflow communication from the inlet to the rim cavity, and a thermally responsive spring member connected to move the valve head.

6. The gas turbine engine of claim 5, and further comprising:
an inner cylinder member closing an end of the outer cylinder member and forming an abutting surface for the spring member.

7. The gas turbine engine of claim 6, and further comprising:
a ratcheting assembly connected between the inner cylinder and the movable members of the valve head.

8. The gas turbine engine of claim 1, and further comprising:
The thermally responsive air flow device further comprises:
a valve assembly inserted within the bypass passage, the valve assembly including:
an inner cylinder member having a central axial passage open at one end and a plurality of radial holes;
an outer cylinder member concentric to the inner cylinder member and having a plurality of radial holes;
the radial holes of the inner cylinder member being aligned with the radial holes of the outer cylinder member;
an outer passage formed between an inner wall of the bypass passage and the outer surface of the outer cylinder member; and, the two cylinder members being made of materials having different thermal expansion coefficients such that a change in temperature will move the radial holes out of alignment.

9. The gas turbine engine of claim 8, and further comprising:
an outer annular groove formed on the outer edge of the bypass hole;
an inner annular groove formed on the inner edge of the bypass hole; and,
the cylinder members each having annular portions that are mounted within the annular grooves of the bypass hole.

10. The gas turbine engine of claim 8, and further comprising:
the outer cylinder member includes a plurality of axial holes that communicate the outer passage to the rim cavity.

11. The gas turbine engine of claim 1, and further comprising:
The thermally responsive air flow device further comprises:
a valve assembly inserted within the bypass passage, the valve assembly including:
an inner cylinder member having an end with a plurality of axial holes therein and a stem member forming a central passage open at an opposite end;
an outer cylinder member having a plurality of radial holes therein aligned with the holes in the inner cylinder member;
an outer passage formed between the inner wall of the bypass passage and the outer cylinder member;
a plug having an axial hole, the plug closing the central passage while the hole provides a fluid communication between the central passage and the rim cavity; and the two cylinder members being made of materials having different thermal expansion coefficients such that a change in temperature will move the radial holes out of alignment.

12. The gas turbine engine of claim 11, and further comprising:
the thermally responsive air flow device further comprises:
a valve assembly inserted within the bypass passage, the valve assembly including:
the outer cylinder member having an end that closes the outer passage to the rim cavity such that airflow into the outer passage is forced through the radial holes and into the central passage.

13. The gas turbine engine of claim 1, and further comprising:
the thermally responsive air flow device further comprises:
a valve assembly inserted within the bypass passage, the valve assembly including:
an outer passage formed in the stator wall;
an outer cylinder member forming a central passage and having an inlet end with a flow restrictor forming surface thereon, an opposite end that is open, and a plurality of radial holes communicating the central passage with the outer passage;
an end cap member having a stem member extending therefrom in the central passage;
a valve head member extending from the stem member and forming a flow restrictor with the flow restrictor forming surface on the outer member; and,
The outer cylinder member and the end cap member being made of materials having different thermal expansion coefficients such that a change in temperature will move the valve head with respect to the flow restrictor forming surface.

14. The gas turbine engine of claim 13, and further comprising:
the end cap member is exposed to the airflow temperature of the rim cavity and the valve head is located on the inlet end of the valve assembly.

15. A process of purging a rim cavity of a gas turbine engine, the gas turbine engine having a rotor and a stator adjacent to the rotor, a side plate over the rotor, the rim cavity formed between the stator and the side plate, the process comprising the steps of:
providing for a seal member between the stator and a rotating part of the side plate;
providing for a bypass passage in the stator; and,
inserting a thermally responsive valve member within the bypass passage, where the thermally responsive valve member reduces airflow through the bypass passage as the airflow temperature in the rim cavity decreases.

16. The process of purging a rim cavity of a gas turbine engine of claim 15, and further comprising the step of:
providing for the seal member to be a brush seal.

17. The process of purging a rim cavity of a gas turbine engine of claim 15, and further comprising the step of:
providing for the thermally responsive valve member to be a bimetallic valve member.

18. The process of purging a rim cavity of a gas turbine engine of claim 15, and further comprising the step of:
providing for a ratcheting member associated with the thermally responsive valve member to limit the oscillation of the bypass valve head as a result of a thermally cyclic environment.

19. In a gas turbine engine having a rotor and a stator adjacent to the rotor, a rim cavity with a brush seal forming a seal leading into the rim cavity, and a bypass air passage passing through the stator and into the rim cavity such that airflow through the brush seal and through the bypass passage forms a parallel air flow into the rim cavity, the improvement comprising:
thermally responsive valve means associated with the bypass passage to decrease the airflow through the bypass passage as the brush seal wears.

20. The gas turbine engine of claim 19, and further comprising:
a ratcheting member associated with the thermally responsive valve means to limit the oscillation of the bypass valve head as a result of a thermally cyclic environment.

* * * * *